(12) United States Patent
Kim et al.

(10) Patent No.: US 10,732,151 B2
(45) Date of Patent: Aug. 4, 2020

(54) RESONATOR DEVICE FOR ENHANCING OUTPUT AND SENSITIVITY OF GUIDED WAVE TRANSDUCERS AND THE METHOD OF ENHANCEMENT CONTROLLING

(71) Applicants: SEOUL NATIONAL UNIVERSITY R&DB FOUNDATION, Seoul (KR); Center for Advanced Meta-Materials, Yuseong-gu, Daejeon (KR)

(72) Inventors: Yoon Young Kim, Seoul (KR); Ki Yean Kim, Seoul (KR)

(73) Assignees: SEOUL NATIONAL UNIVERSITY R&DB FOUNDATION, Seoul (KR); Center for Advanced Meta-Materials, Yuseong-gu, Daejeon (KR)

( * ) Notice: Subject to any disclaimer, the term of this patent is extended or adjusted under 35 U.S.C. 154(b) by 0 days.

(21) Appl. No.: 16/592,345

(22) Filed: Oct. 3, 2019

(65) Prior Publication Data
US 2020/0110061 A1    Apr. 9, 2020

(30) Foreign Application Priority Data
Oct. 5, 2018    (KR) .................. 10-2018-0119311

(51) Int. Cl.
*G01N 29/24*    (2006.01)
*G01N 29/34*    (2006.01)
*G01N 29/42*    (2006.01)

(52) U.S. Cl.
CPC ......... *G01N 29/42* (2013.01); *G01N 29/2412* (2013.01); *G01N 29/2437* (2013.01); *G01N 29/348* (2013.01)

(58) Field of Classification Search
CPC ............. G01N 29/2412; G01N 29/348; G01N 29/2437; G01N 29/42
(Continued)

(56) References Cited

U.S. PATENT DOCUMENTS

| 6,390,985 | B1 | 5/2002 | Mamayek | |
|---|---|---|---|---|
| 7,295,001 | B2 | 11/2007 | Kim et al. | |
| 8,610,518 | B1 * | 12/2013 | Solal | H03H 9/0066 310/313 B |
| 8,810,426 | B1 * | 8/2014 | Morris | G08B 3/10 116/137 R |

(Continued)

FOREIGN PATENT DOCUMENTS

| JP | 2010-041671 A | 2/2010 |
|---|---|---|
| KR | 10-1253965 B1 | 4/2013 |

(Continued)

OTHER PUBLICATIONS

Kim, et al., "Enhanced transduction of MPT for antisymmetric Lamb waves using a detuned resonator," Smart Mater. Struct. 28 (2019) 075035, 12 pages. Retrieved from https://doi.org/10.1088/1361-665X/ab20fc.

(Continued)

*Primary Examiner* — Jacques M Saint Surin
(74) *Attorney, Agent, or Firm* — Kilpatrick Townsend & Stockton LLP

(57) ABSTRACT

A transducer complex includes a resonator for enhancing an output and a measurement sensitivity of a guided wave transducer. The transducer complex includes: an ultrasonic transducer attached onto a surface or inserted into an object, the ultrasonic transducer having a longer length in parallel with the surface of the object than a length in a direction perpendicular to the surface of the object and the ultrasonic transducer receiving electric power from an external power source to generate ultrasonic waves or receiving ultrasonic waves from outside to generate electricity; and the resonator attached to the object or the ultrasonic transducer or inserted into the object, the resonator being symmetrically arranged in parallel on the outside of the ultrasonic transducer to be adjacent to the ultrasonic transducer.

14 Claims, 18 Drawing Sheets

(58) Field of Classification Search
USPC .......................................................... 73/579
See application file for complete search history.

(56) References Cited

U.S. PATENT DOCUMENTS

| | | | | |
|---|---|---|---|---|
| 2005/0103107 A1* | 5/2005 | Morris | ................... | G01N 29/06 |
| | | | | 73/642 |
| 2009/0189488 A1* | 7/2009 | Ray | ........................ | G10K 9/122 |
| | | | | 310/334 |
| 2010/0309018 A1* | 12/2010 | Ray | ........................ | G01S 7/521 |
| | | | | 340/8.1 |

FOREIGN PATENT DOCUMENTS

| KR | 10-1450076 B1 | 10/2014 |
|---|---|---|
| KR | 1020160029200 A | 3/2016 |
| KR | 2018-0095779 A | 8/2018 |

OTHER PUBLICATIONS

Kim, et al., "Near-zero effective impedance with finite phase velocity for sensing and actuation enhancement by resonator pairing," Nature Communications, (2018)9:5255. 10 pages. Retrieved from https://doi.org/10.1038/s41467-018-07697-7.

Kim, I.K., et al., "Shear horizontal wave transduction in plates by magnetostrictive gratings", Journal of Mechanical Science and Technology, vol. 21, DOI:https://doi.org/10.1007/BF02916347, year 2007, p. 693-698.

Zheng, L., et al. "Broadband gradient impedance matching using an acoustic metamaterial for ultrasonic transducers", Scientific Reports, vol. 7, Article No. 42863, Year 2017, DOI:https://doi.org/10.1038/srep42863, 9 pages.

* cited by examiner

RESONATOR DEVICE FOR ENHANCING OUTPUT AND SENSITIVITY OF GUIDED WAVE TRANSDUCERS AND THE METHOD OF ENHANCEMENT CONTROLLING

CROSS-REFERENCE TO RELATED APPLICATION

This application claims the benefits of Korean Patent Applications No. 10-2018-0119311, filed on Oct. 5, 2018, in the Korean Intellectual Property Office, the disclosure of which is incorporated herein in its entirety by reference.

BACKGROUND

1. Field

One or more embodiments of the disclosure relate to a resonator device, and more particularly, to a resonator device for enhancing an output and a measurement sensitivity of a guided wave transducer and a method of controlling enhancement of the output and the measurement sensitivity.

2. Description of Related Art

A transducer collectively refers to an actuator that generates a signal and a sensor that measures a signal, and may be used in a device capable of both generating and measuring a signal.

When the transducer functions as an actuator, there are a lot of advantages, e.g., a signal may be easily measured and may be transferred farther, and measurement sensitivity of the signal may be improved, as the transducer output increases. Thus, there have been many attempts to improve an output of a transducer. Conventional methods of enhancing an output of a transducer have been limited to impedance matching and a frequency or wavelength matching. Such attempts were effective in increasing the performance of a transducer to an output limit by using a design of impedance matching. Also, there has been an effect of constructive superposing of waves by arranging transducers according to a specific relationship with a frequency or a wavelength. However, it has not been made to increase an output of a transducer by reducing impedance itself rather than the impedance matching. Accordingly, there has been a necessity of finding a method of increasing an output of a transducer itself beyond the limit of the related art.

PRIOR ART DOCUMENTS

Patent Documents (Patent Document 1) Korean Registered Patent No. 10-1253965
(Patent Document 2) Korean Laid-open Patent Publication No. 10-2016-0029200
(Patent Document 3) Japanese Laid-open Patent Publication No. 2010-0041671
(Patent Document 4) Korean Registered Patent Publication No. 10-1450076

SUMMARY

One or more embodiments of the disclosure provide a transducer having an increased output or an enhanced measurement sensitivity without using a plurality of transducers, and a method of adjusting an amplified frequency and an output increase rate of the transducer.

Additional aspects will be set forth in part in the description which follows and, in part, will be apparent from the description, or may be learned by practice of the presented embodiments of the disclosure.

According to an aspect of the disclosure, a transducer complex includes: a resonator for improving an output and a measurement sensitivity of a guided wave transducer, wherein the transducer complex includes: an ultrasonic transducer attached onto a surface or inserted into an object, the ultrasonic transducer having a longer length in parallel with the surface of the object than a length in a direction perpendicular to the surface of the object and the ultrasonic transducer receiving electric power from an external power source to generate ultrasonic waves or receiving ultrasonic waves from outside to generate electricity; and the resonator attached to the object or the ultrasonic transducer or inserted into the object, the resonator being symmetrically arranged in parallel on the outside of the ultrasonic transducer to be adjacent to the ultrasonic transducer.

According to another aspect of the disclosure, a method of enhancing an output of a transducer complex which comprises a resonator, the method includes: attaching a transducer complex to a surface of an object or inserting the transducer complex into the object, the transducer complex comprising an ultrasonic transducer having a thickness less than a length in a lengthwise direction thereof, and a resonator attached to the object or the ultrasonic transducer or inserted into the object, the resonator being symmetrically arranged on an outer portion of the ultrasonic transducer in parallel with the ultrasonic transducer to be adjacent to the ultrasonic transducer (S1); generating, by the ultrasonic transducer, ultrasonic waves after receiving electric power from an external power source (S2); and reducing an effective impedance of the transducer complex and increasing an output of the transducer complex, since the resonator partially reflects the ultrasonic waves within a certain frequency band of the ultrasonic waves due to a dynamic absorbing and the waves overlap one another in the transducer complex (S3).

According to another aspect of the disclosure, a method of enhancing a measurement sensitivity of a transducer complex which comprises a resonator, the method includes: attaching a transducer complex to a surface of an object or inserting the transducer complex into the object, the transducer complex comprising an ultrasonic transducer having a thickness less than a length in a lengthwise direction thereof, and a resonator attached to the object or the ultrasonic transducer or inserted into the object, the resonator being symmetrically arranged on an outer portion of the ultrasonic transducer in parallel with the ultrasonic transducer to be adjacent to the ultrasonic transducer (S1); generating, by the ultrasonic transducer, electricity by receiving external ultrasonic waves (S2); and reducing an effective impedance of the transducer complex and increasing the measurement sensitivity of the transducer complex, since the resonator partially reflects the external ultrasonic waves within a certain frequency band of the external ultrasonic waves due to a dynamic absorbing and the waves overlap one another in the transducer complex (S3).

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1A:
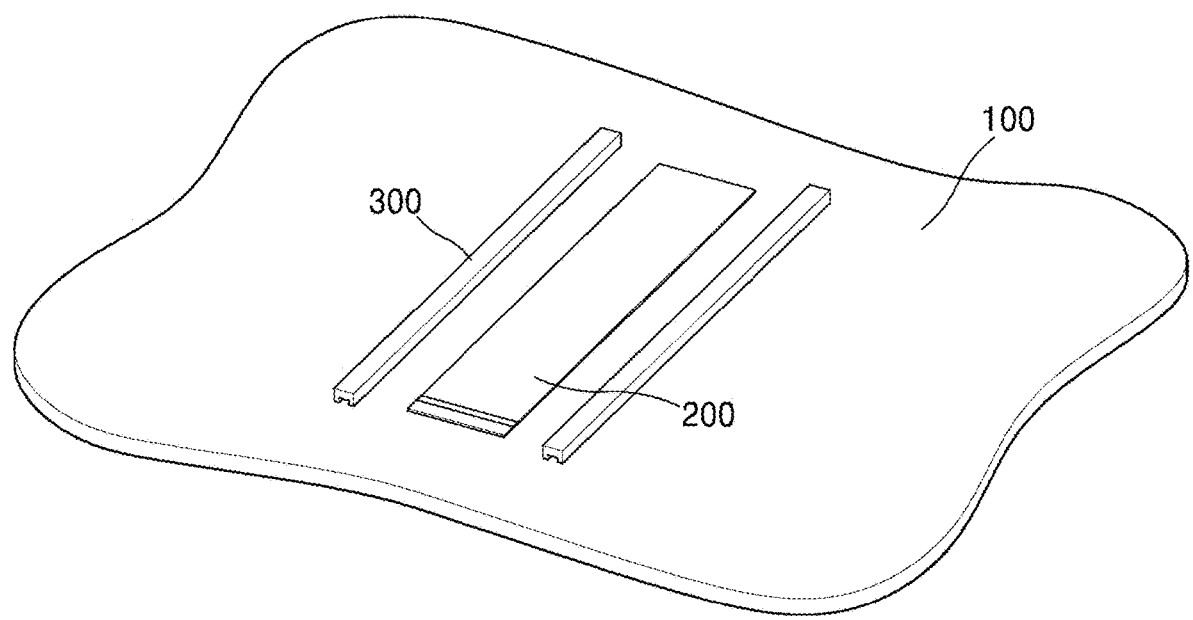
FIGS. 1A to 1C are diagrams of a transducer complex including an ultrasound wave transducer and a resonator according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

These components are only used to distinguish one component from another. The terms used in the present specification are merely used to describe particular embodiments, and are not intended to limit the present disclosure. An expression used in the singular encompasses the expression of the plural, unless it has a clearly different meaning in the context.

In the present specification, it is to be understood that the terms such as "including," "having," and "comprising" are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

Unless otherwise defined, all terms (including technical and scientific terms) used herein have the same meanings as commonly understood by one of ordinary skill in the art to which this invention belongs. Such terms as those defined in a generally used dictionary are to be interpreted to have the meanings equal to the contextual meanings in the relevant field of art, and are not to be interpreted to have ideal or excessively formal meanings unless clearly defined in the present invention.

Hereinafter, one or more embodiments of the present disclosure will be described in detail with reference to accompanying drawings.

Figure 1B:
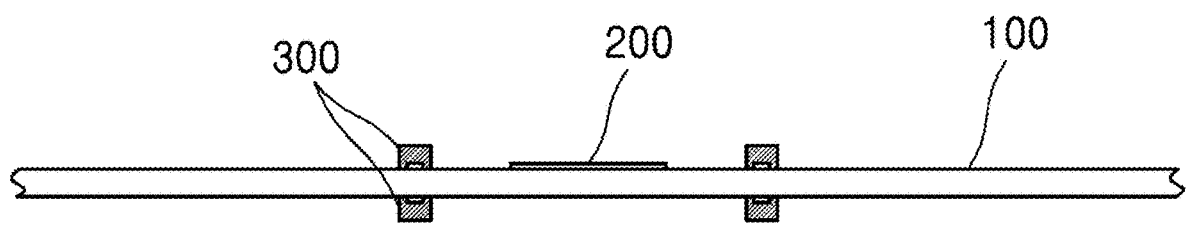
Figure 1C:
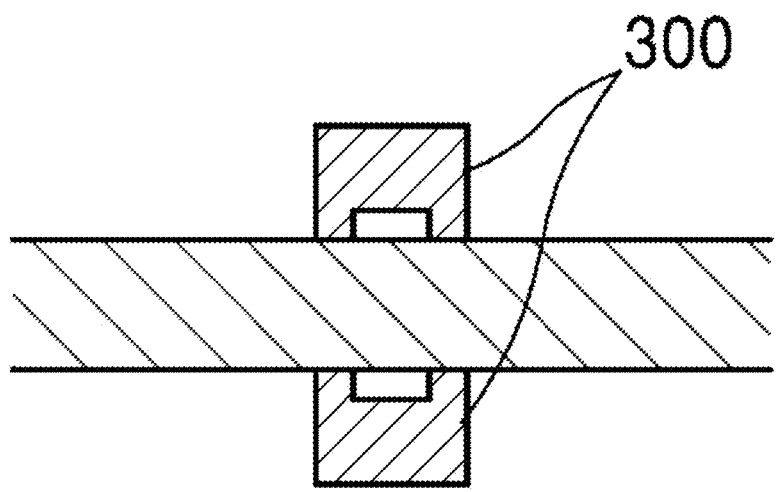

FIGS. 1A to 1C are diagrams of a transducer complex including an ultrasonic transducer and a resonator according to an embodiment.

An ultrasonic transducer 200 generates an ultrasound wave by receiving an external electric signal or measures an ultrasound wave from outside by converting the ultrasound wave into an electric signal, and the ultrasonic transducer 200 of the disclosure may be applied to all kinds of ultrasonic transducers. In detail, the ultrasonic transducer 200 of the disclosure may be applied to all kinds of ultrasonic wave excitation sources such as magnetorestriction, piezoelectric, electromagnetic acoustic wave, and measuring devices such as an accelerometer, a laser Doppler vibrometer, etc.

A resonator 300 is located adjacent to the ultrasonic transducer 200 to amplify an output of an ultrasonic wave generated by the ultrasonic transducer 200 by using a dynamic absorbing effect or to increase a measurement sensitivity of the ultrasonic transducer 200 that is to measure an external ultrasonic wave by amplifying the external ultrasonic wave. The resonator (300) may include metal, glass, synthetic resin, or a combination thereof.

An ultrasonic transducer and a resonator may have various shapes according to a purpose of using a transducer complex, the size and shape of an object that is an application target, and methods of attaching, connecting, or coupling the transducer complex to the object. For example, when the transducer complex is attached to an object having a flat plate shape, the transducer complex may have an ultrasonic transducer of a rectangular plate shape to be firmly attached to the object. In another example, when the transducer complex has a pipe shape, the ultrasonic transducer of the transducer complex may have a rectangular curved plate to be attached to an object or may have a rod shape having a diameter smaller than that of the pipe to be inserted into the pipe. When the ultrasonic transducer has a flat plate shape, the ultrasonic transducer has a smaller thickness as compared with a length thereof to be easily attached to or inserted into the object.

Also, the resonator may have a symmetric shape with respect to the ultrasonic transducer, so that the waveform of the ultrasonic wave generated or measured by the ultrasonic transducer may have simple or symmetric shape and the resonator may have an appropriate shape for enhancing the waveform.

For example, the ultrasonic transducer may have a one-dimensional straight line shape attached to an object of a flat plate shape, and the resonator may have two straight lines spaced apart from the one-dimensional straight line in parallel with each other or a pipe shape surrounding the ultrasonic transducer. Alternatively, the ultrasonic transducer may have a rectangular flat plate shape and the resonator may have two or four-rod shapes spaced apart from the flat plate in parallel with one another or a square shape surrounding the flat plate. Alternatively, the ultrasonic transducer may have a disc shape and the resonator may have one or more concentric circular plates spaced a predetermined distance from the ultrasonic transducer and surrounding the ultrasonic transducer. Alternatively, the ultrasonic transducer may have a spherical shape and the resonator may have a shell-type shape surrounding the sphere. Alternatively, the ultrasonic transducer may have a rod-type shape and the resonator may have a pipe shape surrounding the rod and spaced apart a predetermined distance from the rod in a radial direction. Alternatively, the ultrasonic transducer may have a pipe shape and the resonator may have a pipe shape surrounding the pipe and spaced apart a predetermined distance from the pipe. In addition, an appropriate shape of the ultrasonic transducer may be implemented according to a shape of the object, and a shape of the resonator may be implemented taking into account a waveform of an ultrasonic wave that is generated or measured according to the shape of the ultrasonic transducer.

In the embodiment illustrated with reference to FIGS. 1A and 1B, the ultrasonic transducer 200 is a piezoelectric body having a rectangular plate shape attached to a surface of an aluminum plate 100 having a thickness of 2 mm, which is an object, by using an epoxy, and a resonator includes four rods that are arranged on opposite surfaces of the aluminum plate 100, being spaced apart a predetermined distance from the ultrasonic transducer 200 in parallel with a lengthwise direction of the ultrasonic transducer 200.

In addition, as shown in FIG. 1C, a cross-section of the resonator includes a central beam arranged in parallel with the surface of the aluminum plate 100, that is, the object, and two support portions arranged perpendicular to the surface of the aluminum plate and connected to opposite ends of the central beam. Due to the cross-section of the resonator having "[" shape and arrangement, the transducer complex of FIG. 1 is designed to mainly generate symmetric lamb waves ($S_0$) of the lowest difference at a frequency band of 60 kHz to 80 kHz.

Figure 2:
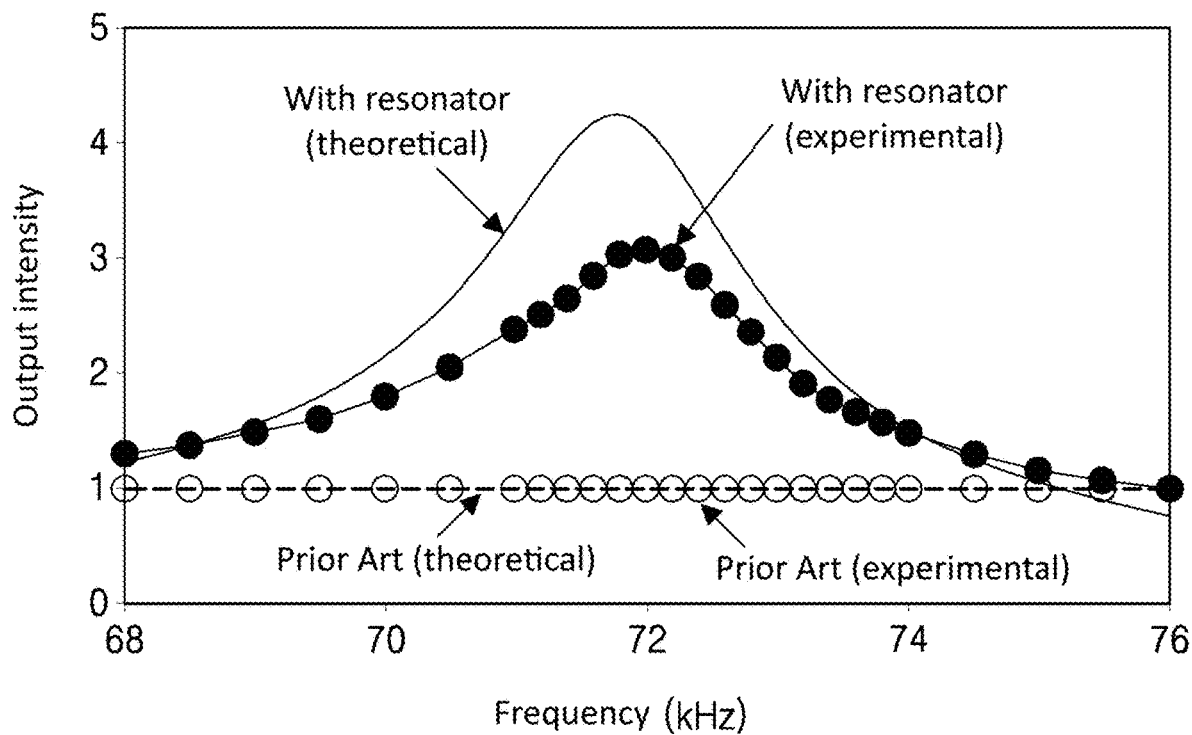
FIG. 2 is graphs of an output and a measured value of an ultrasound wave from the transducer complex of FIG. 1, which are compared with those of a transducer according to the related art.
Figure 2:
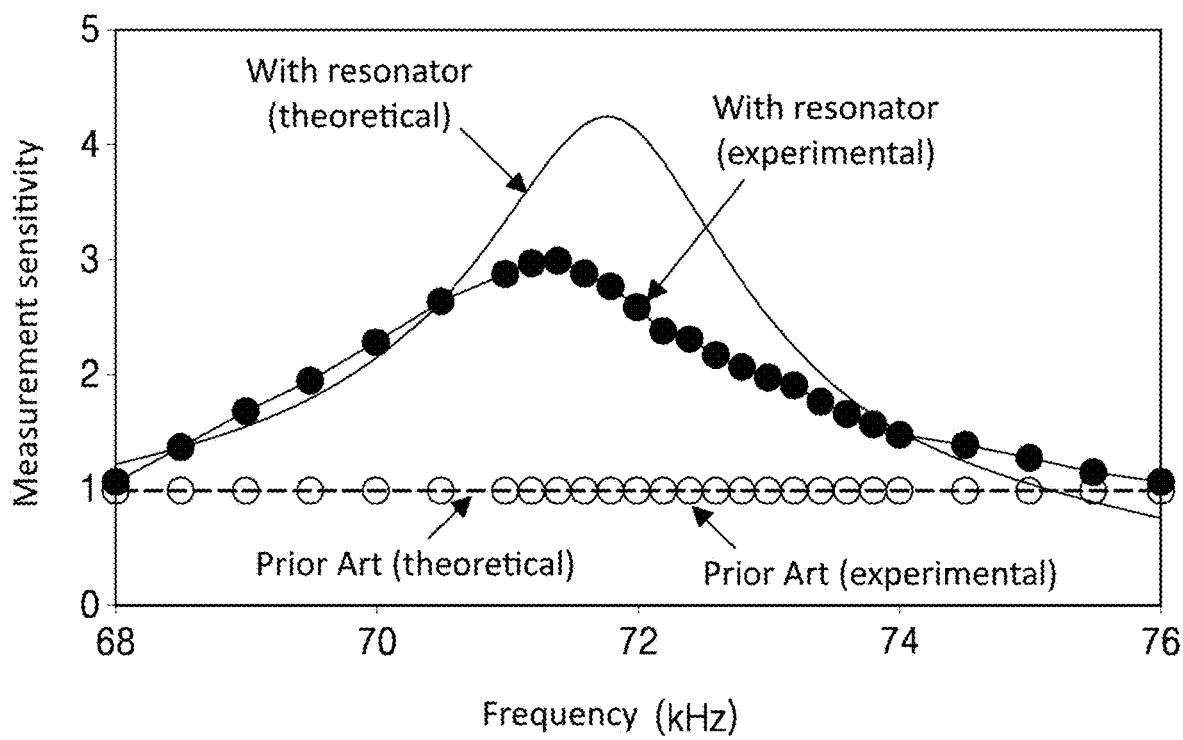

In the upper graph of FIG. 2, an ultrasound wave output of the symmetric lamb wave mode from the transducer complex of FIG. 1 according to the embodiment is compared with an output from a transducer (having no resonator) according to the prior art. The solid line denotes theoretically calculated values and the dotted line denotes measured values through experiments. Accordingly, it can be seen that an output from the transducer complex according to the embodiment is greatly enhanced within a certain frequency range.

In addition, in the lower graph of FIG. 2, an ultrasonic wave generated outside measured by the transducer complex of FIG. 1 according to the embodiment is compared with an ultrasonic wave measured by a transducer (with no resonator) according to the prior art. The solid line denotes theoretically calculated values and the dotted line denotes measured values through experiments. Accordingly, it can be seen that a measurement sensitivity of the transducer complex according to the embodiment is greatly enhanced within a certain frequency range.

Figure 3A:
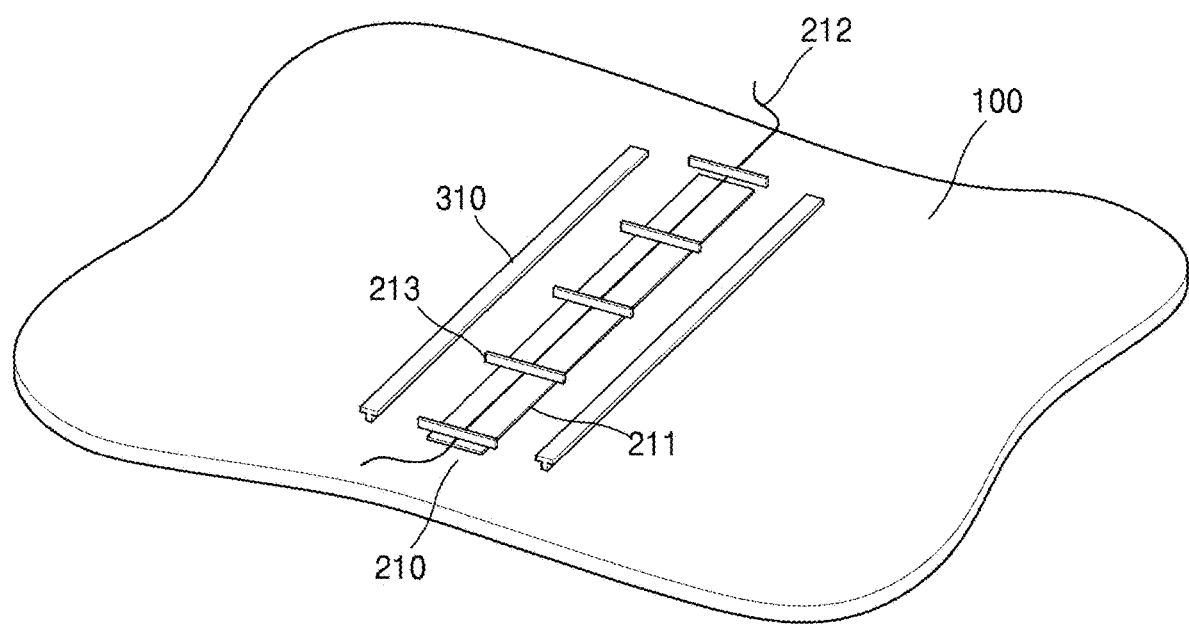
FIGS. 3A and 3B are diagrams of a transducer complex including an ultrasound wave transducer using a magnetostrictive patch and a resonator having a T-shape cross-section, according to an embodiment.
Figure 3B:
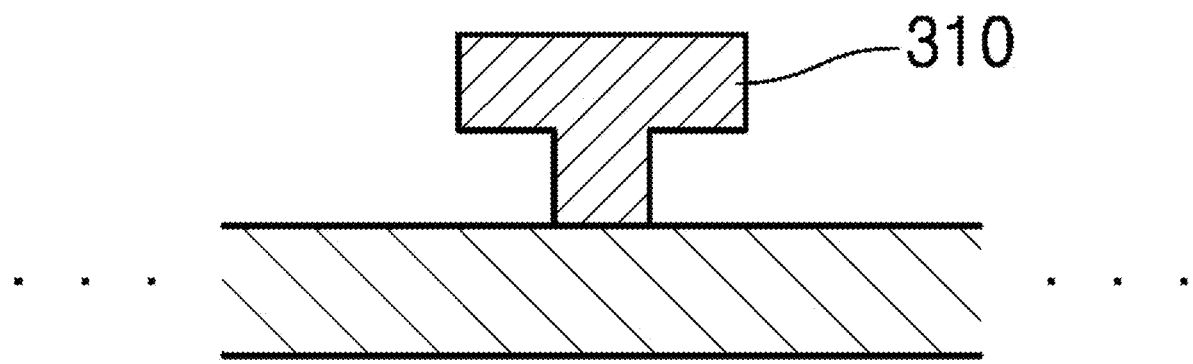

FIGS. 3A and 3B are diagrams of a transducer complex including an ultrasound wave transducer using a magnetostrictive patch and a resonator having a T-shape cross-section, according to an embodiment.

As described above, one or more embodiments of the disclosure may be implemented regardless of a type of the ultrasonic transducer. FIG. 3A shows an ultrasonic transducer 210 of a magnetostrictive type. The ultrasonic transducer (210) of a magnetostrictive type includes a magnetostrictive patch 211 having a crystal lattice, a length of which varies depending on an external magnetic field, a coil 212 receiving electricity and forming a magnetic field around itself, and a magnetic material 213 forming a static magnetic field. When an alternating current (AC), for example, is applied to the coil 212, an intensity of a magnetic field applied to the magnetostrictive patch 211 changes, and accordingly, the magnetostrictive patch 211 is deformed according to a frequency of the AC electricity and ultrasonic waves are induced. The ultrasonic transducer of the magnetostrictive type may have different structure from that of FIG. 3A, provided that the above principle is adopted.

In addition, as shown in FIG. 3B, a cross-section of a resonator 310 includes a central beam arranged on a surface of the aluminum plate 100 that is an object in parallel with the aluminum plate 100 and one support portion arranged perpendicular to the surface of the aluminum plate and connected to a center of the central beam. Due to the cross-section and arrangement of the resonator 310 having a T-shape, the transducer complex of FIG. 3 is designed to mainly generate shear waves ($SH_0$) of the lowest difference at a frequency band of 60 kHz to 120 kHz.

Figure 4:
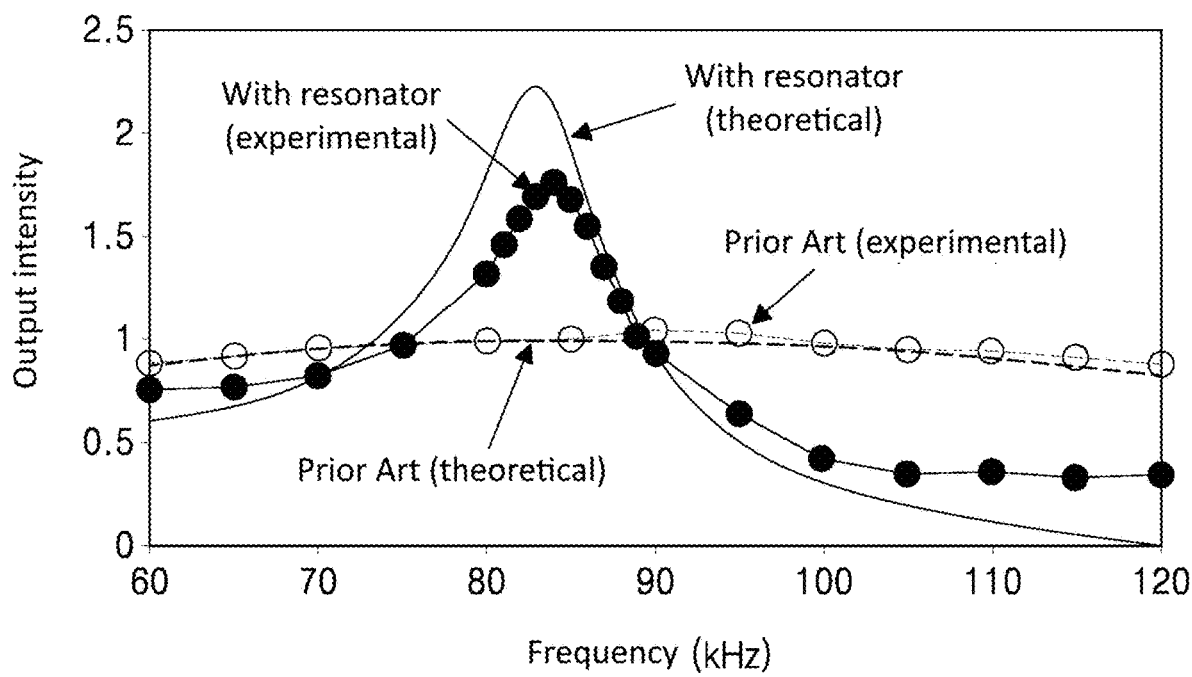
FIG. 4 is graphs of an output and a measured value of an ultrasound wave from the transducer complex of FIG. 3, which are compared with those of a transducer according to the related art.
Figure 4:
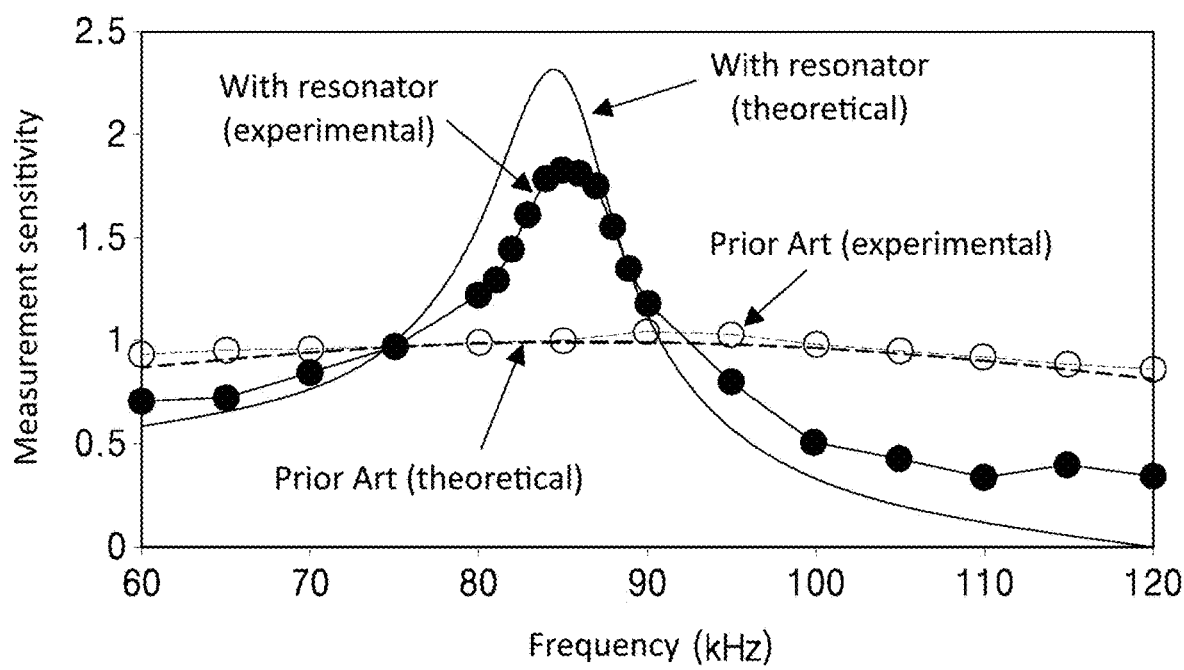

In the upper graph of FIG. 4, an ultrasound wave output from the transducer complex of FIGS. 3A and 3B according to the embodiment is compared with an output from a transducer (having no resonator) according to the related art. The solid line denotes theoretically calculated values and the dotted line denotes measured values through experiments. Accordingly, it can be seen that an output from the transducer complex according to the embodiment is greatly enhanced within a certain frequency range.

In addition, in the lower graph of FIG. 4, an ultrasonic wave generated outside measured by the transducer complex of FIG. 3 according to the embodiment is compared with an ultrasonic wave measured by a transducer (with no resonator) according to the prior art. The solid line denotes theoretically calculated values and the dotted line denotes measured values through experiments. Accordingly, it can be seen that a measurement sensitivity of the transducer complex according to the embodiment is greatly enhanced within a certain frequency range.

Figure 5A:
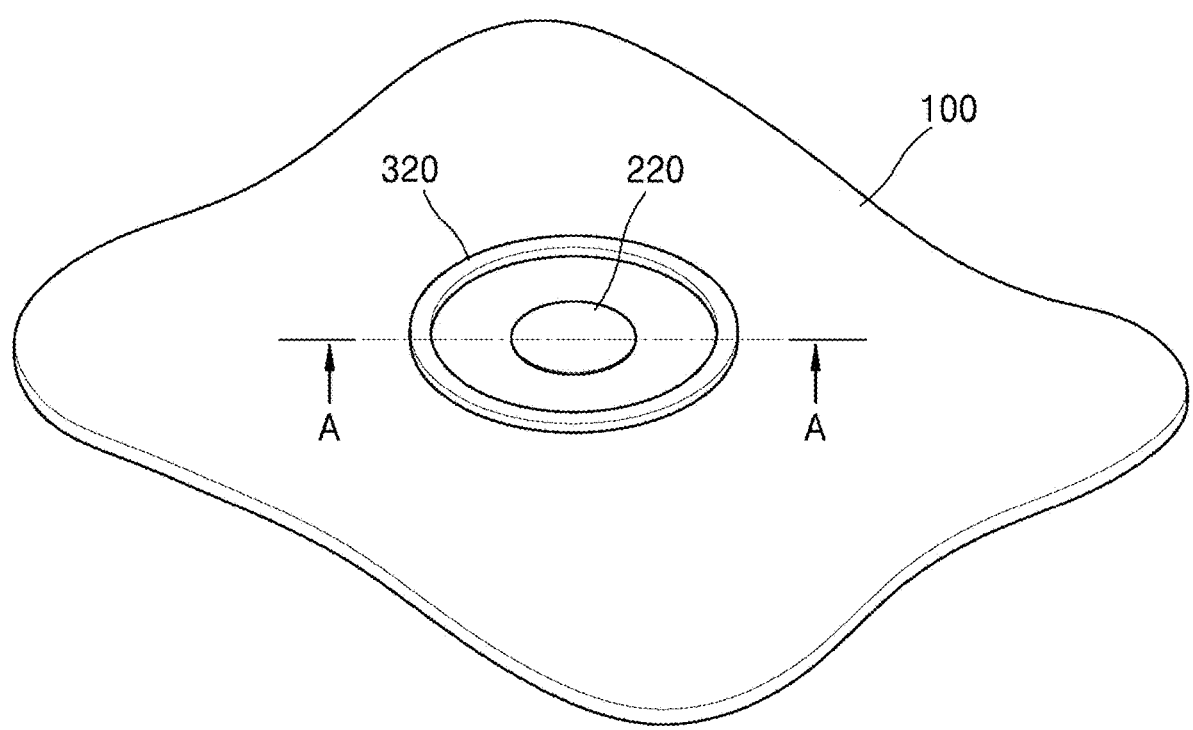
FIGS. 5A and 5B are diagrams of a transducer complex including a disc-type ultrasound wave transducer and a resonator according to an embodiment.
Figure 5B:
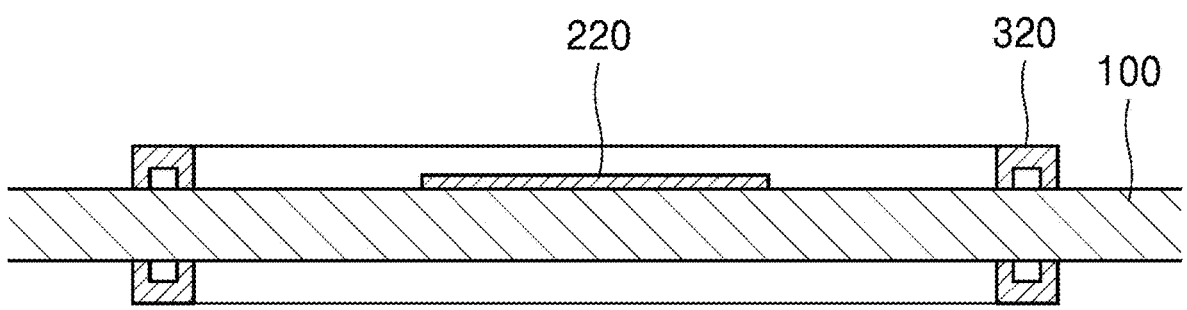

FIGS. 5A and 5B are diagrams of a transducer complex including an ultrasound wave transducer 220 of a disc-type and a resonator 320 according to an embodiment. In FIG. 5A, the ultrasonic transducer 220 may have a disc shape, unlike the ultrasonic transducer of FIG. 1 or FIG. 3 which has a rectangular plate shape. The resonator 320 of FIG. 5A has a shape obtained by rotating the cross-section of the resonator of FIG. 1 by 360□ about a center axis and is spaced a predetermined distance from the ultrasonic transducer to form a concentric circle. FIG. 5B is a cross-sectional view taken along a line A-A of FIG. 5A, and like in FIG. 1, the resonator of the same shape is also arranged on a rear surface of the aluminum plate 100 that is an object.

Due to the such structure, the transducer complex of FIG. 5 generates ultrasonic waves of an omni-directional lamb wave mode ($S_0$).

Figure 6:
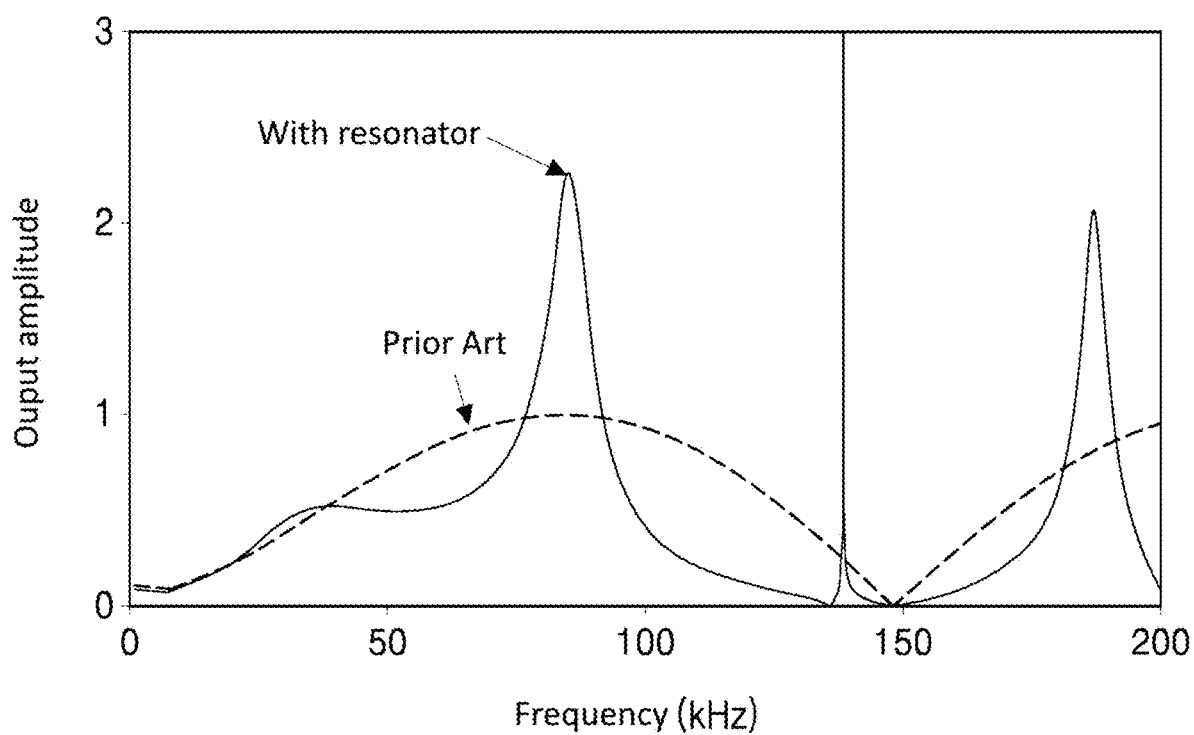
FIG. 6 is a graph of an output of an ultrasound wave from the transducer complex of FIG. 5, as compared with those of a transducer according to the related art.

In FIG. 6, an ultrasound wave output from the transducer complex of FIG. 5 according to the embodiment is compared with an output from a transducer (having no resonator) according to the prior art. Accordingly, it can be seen that an output from the transducer complex according to the embodiment is greatly enhanced within a certain frequency range.

Figure 7A:
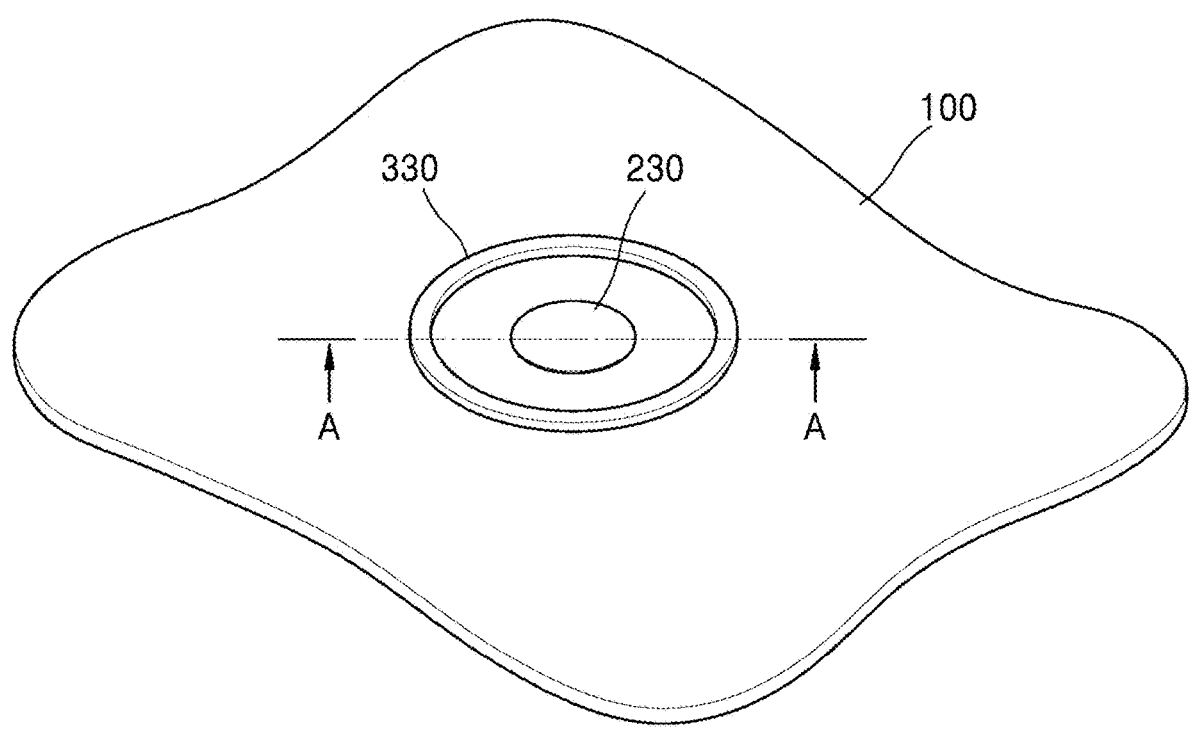
FIGS. 7A and 7B are diagrams of a transducer complex including a disc-type ultrasound wave transducer and a resonator having a T-shape cross-section, according to an embodiment.
Figure 7B:
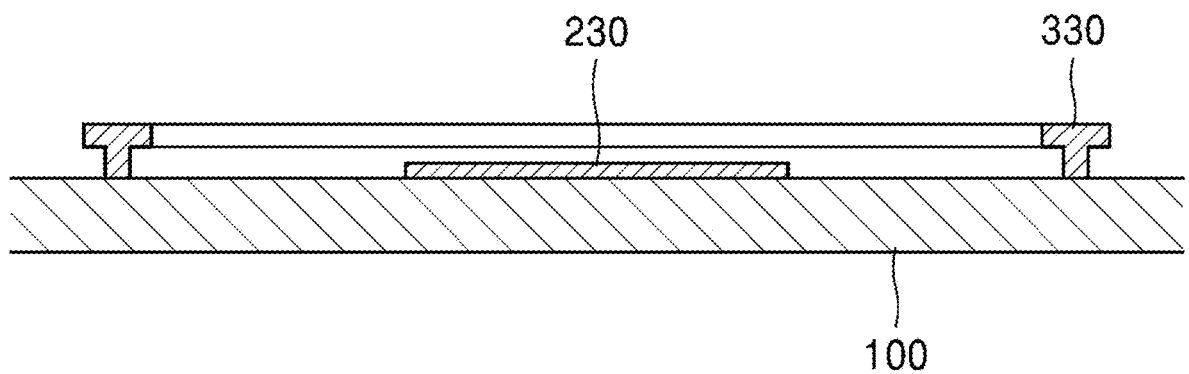

FIGS. 7A and 7B are diagrams of a transducer complex including a disc-type ultrasound wave transducer 230 and a resonator 330 having a T-shape cross-section, according to an embodiment. In the transducer complex of FIG. 7, the resonator 330 has a cross-section of T-shape, not "["-shape, as compared with the transducer complex of FIG. 5 (see FIG. 7B that is a cross-sectional view taken along a line A-A of FIG. 7A). Due to the such structure, the transducer complex of FIG. 7 generates ultrasonic waves of an omni-directional shear wave mode ($SH_0$).

Figure 8:
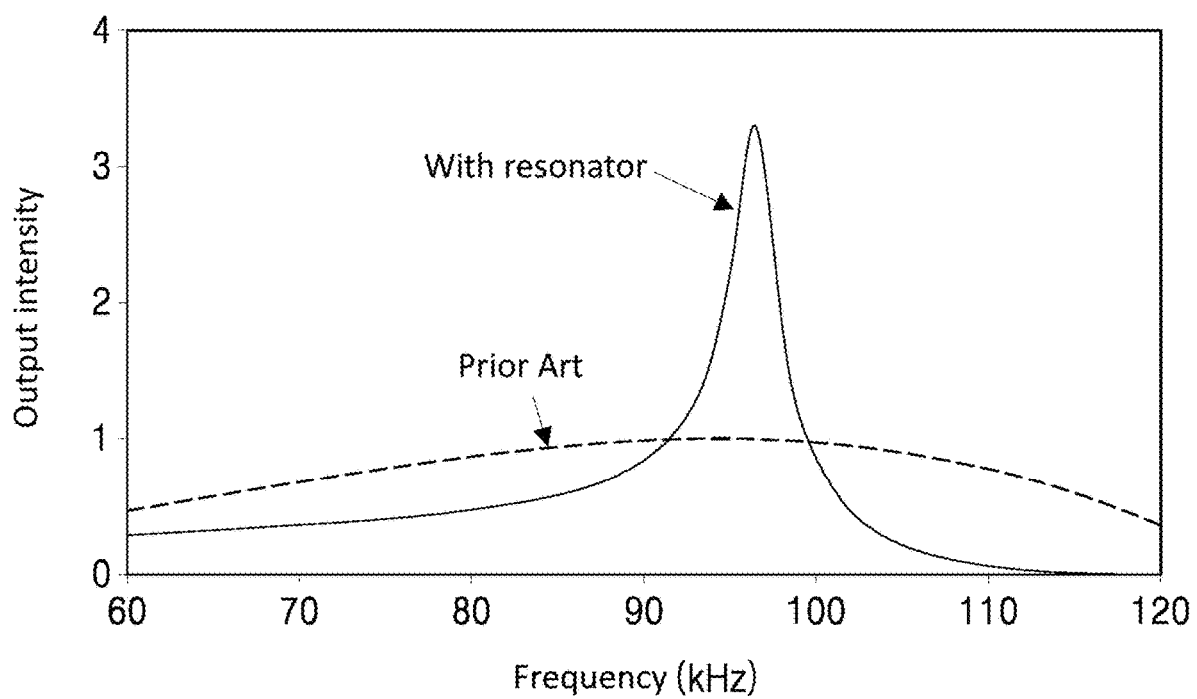
FIG. 8 is a graph of an output of an ultrasound wave from the transducer complex of FIG. 7, as compared with those of a transducer according to the related art.

FIG. 8 is a graph of an output of an ultrasound wave from the transducer complex of FIG. 7, as compared with those of a transducer (with no resonator) according to the prior art. Accordingly, it can be seen that an output from the transducer complex according to the embodiment is greatly enhanced within a certain frequency range.

The transducer complex according to the embodiments of the disclosure may exhibit greatly enhanced output or greatly enhanced measurement sensitivity within a predetermined frequency range. When the resonator arranged on the outside of the ultrasonic transducer resonates in the above frequency range, waves of the ultrasonic wave generated by or measured by the ultrasonic transducer are partially reflected due to a dynamic vibration absorbing effect. As a result, waves overlap in the ultrasonic transducer, and the output from the ultrasonic transducer or the measurement sensitivity of the ultrasonic transducer may be improved.

The output of the ultrasonic transducer complex, which is amplified through the above-mentioned principle, satisfies Equation 1 below.

$$S = -\frac{2F_{inp}}{EA_0} \frac{\sin kL}{\alpha(1 - e^{-2ikW}) - 2i}, \alpha = \frac{1}{z_0}\frac{m\omega s}{s - m\omega^2} = \frac{1}{z_0}\frac{\omega s}{\omega_R^2 - \omega^2} \quad (1)$$

Figure 9:
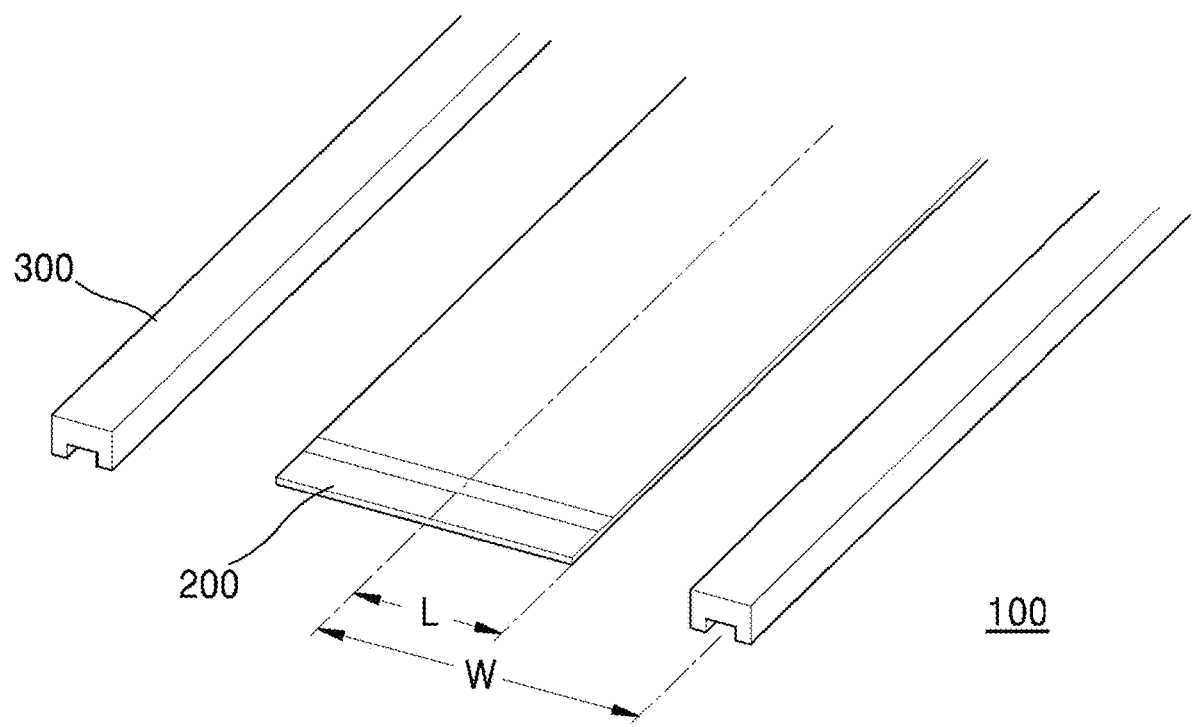
FIG. 9 is a diagram showing a distance between an ultrasound wave transducer and a resonator and a width of the ultrasound wave transducer in the transducer complex of FIG. 1.

S denotes an output of the transducer complex, $F_{inp}$ denotes an exciting force of the transducer, E denotes a rigidity of an object, $A_0$ denotes a cross-sectional area of the object, and k denotes a wave number. L corresponds to half a width of the transducer as shown in FIG. 9. W denotes a distance between the transducer and the resonator, m denotes a mass value of the resonator, $\omega$ denotes an angular frequency, s denotes a spring constant of the resonator, $z_0$ denotes a mechanical impedance of the object, and $\omega_R$ denotes a resonating angular frequency of the resonator.

Figure 10A:
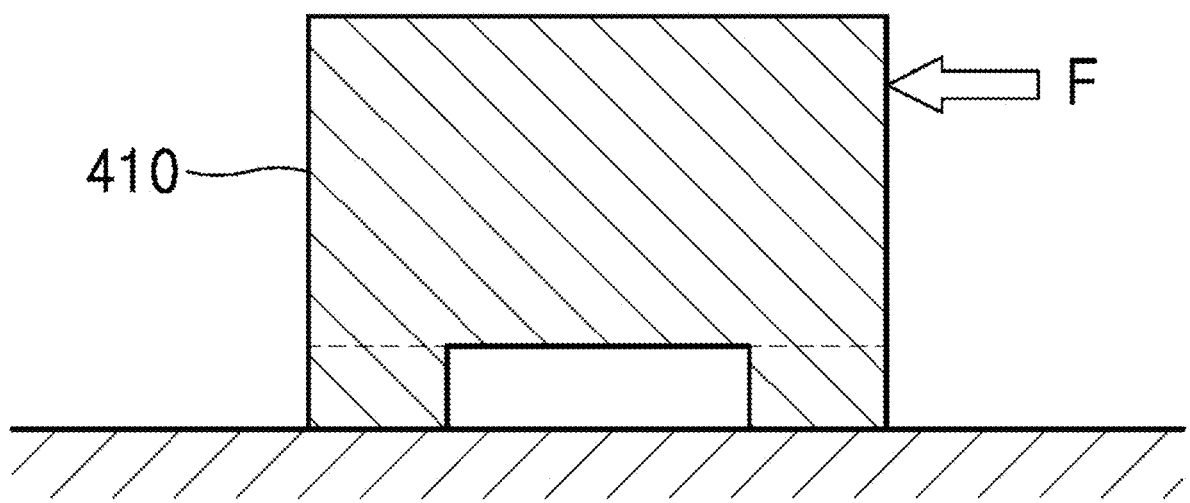
FIGS. 10A and 10B are schematic diagrams illustrating determination on a mass value of a resonator and a spring constant, which are variables of an output, in the transducer complex of FIG. 1.
Figure 10B:
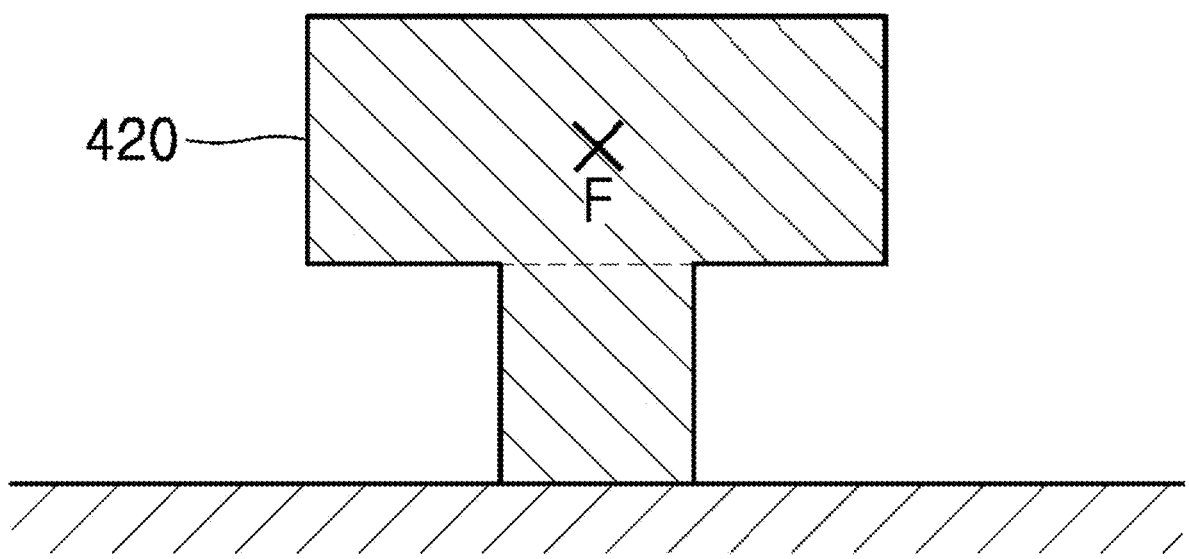

FIGS. 10A and 10B are schematic diagrams illustrating determination on a mass value m of a resonator and a spring constant s, which are variables of an output, in the transducer complex of FIG. 1. The mass value m and the spring constant s of the resonator in the transducer complex may vary depending on whether the resonator has a "["-shape or a T-shape. FIGS. 10A and 10B respectively show cross-sections of the "["-shape resonator and the T-shape resonator.

In FIG. 10A, in a case of the "["-shape resonator, a certain force F is applied to the central beam 410 in a direction that is in parallel with the surface of the object and perpendicular to a lengthwise direction of the central beam in a state where the resonator is fixed onto the object, and an extended length is measured to calculate the spring constant s and the mass m may be determined by Equation 2 below.

$$m = \frac{s}{(2\pi f_R)^2} \quad (2)$$

Here, m denotes a mass value of the resonator, s denotes a spring constant of the resonator and $f_R$ denotes a resonant frequency of the resonator ($f_R = \omega_R/2\pi$).

On the other hand, in FIG. 10B, in a case of the resonator having a T-shaped cross-section, a certain force F is applied to the central beam 420 in a direction in parallel with the surface of the object and the lengthwise direction of the central beam 420 in a state where the resonator is fixed at the object, and then an extended length is measured to calculate the spring constant s and the mass m is determined by Equation 2 above. In FIG. 10B, a sign X is shown to represent that the force is applied in a direction perpendicular to the paper, instead of an arrow, in order to represent the direction of the force F.

Equation 1 and Equation 2 above are applied to the transducer complex of FIG. 1, but one of ordinary skill in the art would have deducted a correlation between each variable and the output with respect to an object and a transducer complex having a different structure based on the embodiments of the disclosure.

Figure 11:
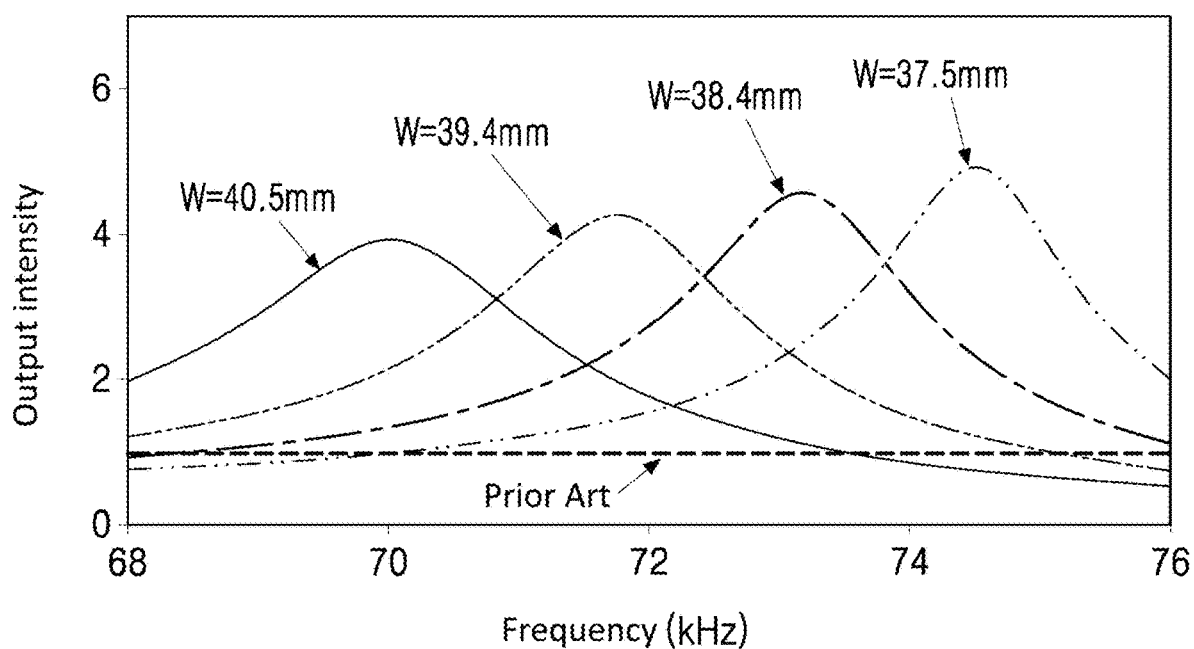
FIG. 11 is a graph showing a variation in an output frequency of the transducer complex of FIG. 1 according to a variation in the distance between the ultrasound wave transducer and the resonator.

FIG. 11 is a graph showing a variation in an output frequency of the transducer complex of FIG. 1 according to a variation in the distance W between the ultrasound wave transducer and the resonator. As the distance W between the ultrasonic transducer and the resonator increases, a value of a frequency at which the output is maximized decreases. Therefore, a value of W may be adjusted based on the above equation in order to maximize the output from the transducer complex at a desired frequency band.

Figure 12:
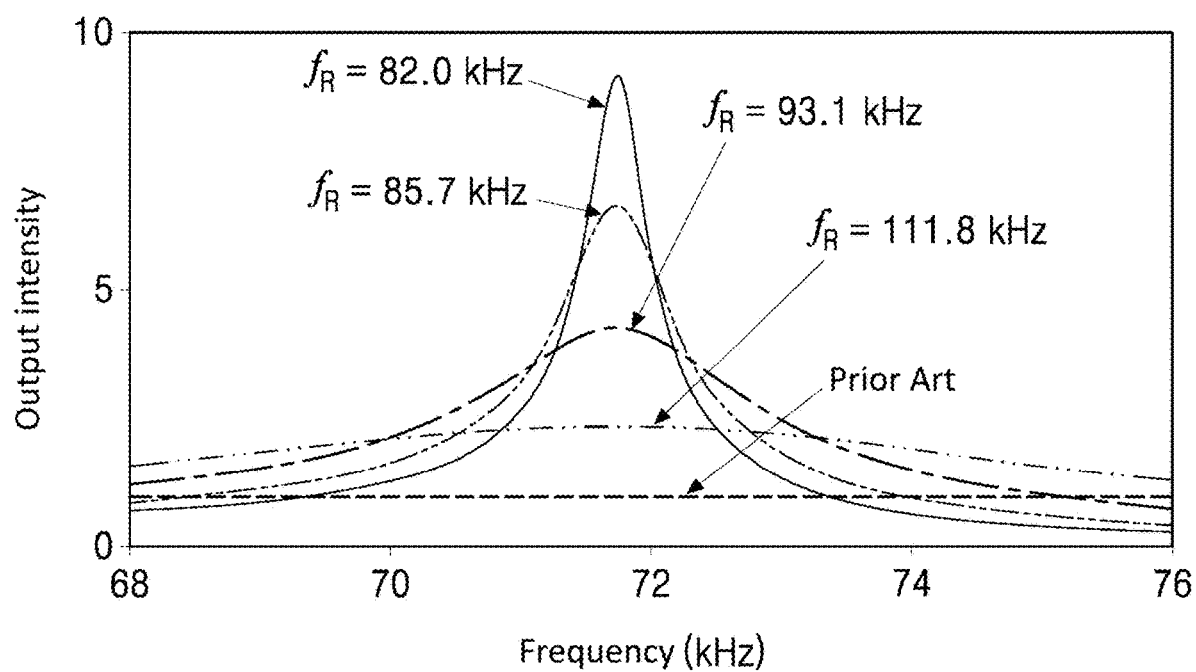
FIG. 12 is a graph showing a variation in an output amplification of the transducer complex of FIG. 1 according to a variation in a resonant frequency of the resonator in the transducer complex.

FIG. 12 is a graph showing a variation in an output amplification of the transducer complex of FIG. 1 according to a variation in a resonant frequency $f_R$ of the resonator in the transducer complex. As a value of the resonant frequency $f_R$ of the ultrasonic transducer decreases, an output amplification of the transducer complex increases. Therefore, a structure and a shape of the ultrasonic transducer may be adjusted to change the resonant frequency or a resonant angular frequency ($\omega_R = 2\pi f_R$) and obtain a desired level of output amplification.

According to the transducer complex of the disclosure, the effective impedance of the object is reduced unlike the impedance matching and the frequency/wavelength matching which are conventional method of enhancing the output of the ultrasonic transducer, and thus, outputs of all exciting vibration forces within a corresponding area may be amplified. Also, the method of enhancing the output of the transducer according to the disclosure may be applied at the same time with the other methods since it is independent of conventional methods. Therefore, the performance of the ultrasonic transducer is improved to the maximum by using the conventional method, and then, the method of the disclosure may be applied to further increase the output amplification effect. The one or more embodiments of the disclosure may be applied to an omni-directional transducer, as well as a transducer of a certain direction.

The above technical features of the disclosure would have not been easily invented from each of the prior art documents or a combination thereof. For example, Patent Document 1 provided above only discloses the ultrasonic transducer and Patent Document 4 provided above only discloses the magnetostrictive patch transducer, but they do not disclose a structure of a resonator coupled to the transducer. Although Patent Document 2 discloses the case member 110, the case member 110 is only provided to protect the ultrasonic converter from outside and is irrelevant with the resonant effect, and thus, the disclosure of Patent Document 2 does not correspond to the resonator structure described in the specification herein. Although Patent Document 3 discloses a case portion 10, Patent Document 3 relates to a speaker that does not need an object that is a target to be detected, in which a vibration plate 11 and air in a main body space S1 resonate, whereas the ultrasonic transducer and the resonator resonate in the disclosure. Thus, an object and type of the resonation are different.

Although only the transducer complex and the method of adjusting the output and the measurement sensitivity of the transducer complex according to one or more embodiments of the disclosure are described herein, one of ordinary skill in the art would have implemented various applications using the transducer complex of the disclosure, which are all included in the scope of the disclosure.

According to the disclosure, the output of the ultrasonic transducer is increased or the measurement sensitivity of the ultrasonic transducer is improved through the impedance reduction to address the issues of the prior art. Also, according to the disclosure, a frequency range to be amplified and an output increase ratio of the ultrasonic transducer may be adjusted.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A transducer complex comprising:
a resonator for improving an output and a measurement sensitivity of a guided wave transducer, wherein the transducer complex comprises:
an ultrasonic transducer attached onto a surface or inserted into an object, the ultrasonic transducer having a longer length in parallel with the surface of the object than a length in a direction perpendicular to the surface of the object and the ultrasonic transducer receiving electric power from an external power source to generate ultrasonic waves or receiving ultrasonic waves from outside to generate electricity; and
the resonator attached to the object or the ultrasonic transducer or inserted into the object, the resonator being symmetrically arranged in parallel on the outside of the ultrasonic transducer to be adjacent to the ultrasonic transducer,
wherein an output of the transducer complex satisfies Equation (1) below:

$$S = -\frac{2F_{inp}}{EA_0}\frac{\sin kL}{\alpha(1-e^{-2ikW})-2i}, \alpha = \frac{1}{z_0}\frac{m\omega s}{s-m\omega^2} = \frac{1}{z_0}\frac{\omega s}{\omega_R^2-\omega^2} \quad (1)$$

(S: an output of the transducer complex, $F_{inp}$: an exciting force of the transducer, E: rigidity of the object, $A_0$: a cross-sectional area of the object, k: wave number, L: half a width of the transducer, W: a distance between the transducer and the resonator, m: a mass value of the resonator, $\omega$: angular frequency, s: a spring constant of the resonator, $z_0$: a mechanical impedance of the object, $\omega_R$: a resonant angular frequency of the resonator).

2. The transducer complex of claim 1, wherein
the ultrasonic transducer generates the ultrasonic waves or generates electricity by receiving the ultrasonic waves from outside in one of a magnetostriction method, a piezoelectric method, and an electromagnetic acoustic method.

3. The transducer complex of claim 2, wherein
a cross-section of the resonator comprises a central beam that is in parallel with a surface of the ultrasonic transducer that is arranged in parallel with the surface of the object, and two support portions connected to opposite ends of the central beam and arranged in a direction perpendicular to the surface of the ultrasonic transducer that is arranged in parallel with the surface of the object, and
the spring constant (s) of the resonator is calculated by measuring an extended length after applying a force to the central beam of the resonator in a direction in parallel with the surface of the object and perpendicular to a lengthwise direction of the central beam in a state in which the resonator is fixed onto the object, and the mass value (m) of the resonator is calculated by Equation (2) below, $$m = \frac{s}{(2\pi f_R)^2} \quad (2)$$

(m: mass value of the resonator, s: spring constant of the resonator, $f_R$: resonant frequency of the resonator).

4. The transducer complex of claim 2, wherein
a cross-section of the resonator comprises a central beam that is in parallel with a surface of the ultrasonic transducer that is arranged in parallel with the surface of the object, and one support portion connected to a center portion of the central beam and arranged in a direction perpendicular to the surface of the ultrasonic transducer that is arranged in parallel with the surface of the object, and
the spring constant (s) of the resonator is calculated by measuring an extended length after applying a force to the central beam in a direction in parallel with the surface of the object and in parallel with a lengthwise direction of the central beam in a state in which the resonator is fixed onto the object, and the mass value (m) of the resonator is calculated by Equation (3) below, $$m = \frac{s}{(2\pi f_R)^2}, \quad (3)$$

(m: mass value of the resonator, s: spring constant of the resonator, $f_R$: resonant frequency of the resonator).

5. The transducer complex of claim 3, wherein
the ultrasonic transducer has a rectangular flat plate shape, and
the resonator comprises a plurality of rods spaced apart from the ultrasonic transducer by an equivalent distance in parallel with the ultrasonic transducer.

6. The transducer complex of claim 3, wherein
the ultrasonic transducer has a disc shape, and
the resonator comprises one or more concentric circles spaced apart from the ultrasonic transducer by an equivalent distance in parallel with the ultrasonic transducer.

7. The transducer complex of claim 4, wherein
the ultrasonic transducer has a rectangular flat plate shape, and
the resonator comprises a plurality of rods spaced apart from the ultrasonic transducer by an equivalent distance in parallel with the ultrasonic transducer.

8. The transducer complex of claim 4, wherein
the ultrasonic transducer has a disc shape, and
the resonator comprises one or more concentric circles spaced apart from the ultrasonic transducer by an equivalent distance in parallel with the ultrasonic transducer.

9. A method of enhancing an output of a transducer complex which comprises a resonator,
the method comprising:
attaching a transducer complex to a surface of an object or inserting the transducer complex into the object, the transducer complex comprising an ultrasonic transducer having a thickness less than a length in a lengthwise direction thereof, and a resonator attached to the object or the ultrasonic transducer or inserted into the object, the resonator being symmetrically arranged on an outer portion of the ultrasonic transducer in parallel with the ultrasonic transducer to be adjacent to the ultrasonic transducer (S1);
generating, by using the ultrasonic transducer, ultrasonic waves after receiving electric power from an external power source (S2); and
reducing an effective impedance of the transducer complex and increasing an output of the transducer complex, since the resonator partially reflects the ultrasonic waves within a certain frequency band of the ultrasonic waves due to a dynamic absorbing and the waves overlap one another in the transducer complex (S3),
wherein the output of the transducer complex satisfies Equation (4) below:

$$S = -\frac{2F_{inp}}{EA_0} \frac{\sin kL}{\alpha(1-e^{-2ikW})-2i}, \alpha = \frac{1}{z_0}\frac{m\omega s}{s-m\omega^2} = \frac{1}{z_0}\frac{\omega s}{\omega_R^2-\omega^2} \quad (4)$$

(S: an output of the transducer complex, $F_{inp}$: an exciting force of the transducer, E: rigidity of the object, $A_0$: a cross-sectional area of the object, k: wave number, L: half a width of the transducer, W: a distance between the transducer and the resonator, m: a mass value of the resonator, $\omega$: angular frequency, s: a spring constant of the resonator, $z_0$: a mechanical impedance of the object, $\omega_R$: a resonant angular frequency of the resonator).

10. The method of claim 9, further comprising
adjusting a frequency at which the output of the transducer complex is maximized by adjusting a distance W between the ultrasonic transducer and the resonator (S4).

11. The method of claim 9, further comprising
adjusting a magnitude of an output amplification of the transducer complex by adjusting a resonant angular frequency ($\omega_R$) of the resonator.

12. A method of enhancing a measurement sensitivity of a transducer complex which comprises a resonator,
the method comprising:
attaching the transducer complex to a surface of an object or inserting the transducer complex into the object, the transducer complex comprising an ultrasonic transducer having a thickness less than a length in a lengthwise direction thereof, and a resonator attached to the object or the ultrasonic transducer or inserted into the object, the resonator being symmetrically arranged on an outer portion of the ultrasonic transducer in parallel with the ultrasonic transducer to be adjacent to the ultrasonic transducer (S1);
generating, by using the ultrasonic transducer, electricity by receiving external ultrasonic waves (S2); and
reducing an effective impedance of the transducer complex and increasing the measurement sensitivity of the transducer complex, since the resonator partially reflects the external ultrasonic waves within a certain frequency band of the external ultrasonic waves due to a dynamic absorbing and the waves overlap one another in the transducer complex (S3),
wherein the measurement sensitivity of the transducer complex satisfies Equation (5) below:

$$S = -\frac{2F_{inp}}{EA_0} \frac{\sin kL}{\alpha(1-e^{-2ikW})-2i}, \alpha = \frac{1}{z_0}\frac{m\omega s}{s-m\omega^2} = \frac{1}{z_0}\frac{\omega s}{\omega_R^2-\omega^2} \quad (5)$$

(S: an output of the transducer complex, $F_{inp}$: an exciting force of the transducer, E: rigidity of the object, $A_0$: a cross-sectional area of the object, k: wave number, L: half a width of the transducer, W: a distance between the transducer and the resonator, m: a mass value of the resonator, $\omega$: angular frequency, s: a spring constant of the resonator, $z_0$: a mechanical impedance of the object, $\omega_R$: a resonant angular frequency of the resonator).

13. The method of claim 12, further comprising
adjusting a frequency at which the measurement sensitivity of the transducer complex is maximized by adjusting a distance W between the ultrasonic transducer and the resonator (S4).

14. The method of claim 12, further comprising
adjusting a magnitude of a measurement sensitivity amplification of the transducer complex by adjusting a resonant angular frequency ($\omega_R$) of the resonator.

\* \* \* \* \*